UNITED STATES PATENT OFFICE.

PEDER FARUP, OF TRONDHJEM, NORWAY, ASSIGNOR, BY MESNE ASSIGNMENTS, TO TITAN CO. A/S., OF CHRISTIANIA, NORWAY.

MANUFACTURE OF WHITE TITANIUM-OXID PRODUCTS.

1,368,392.  Specification of Letters Patent.  Patented Feb. 15, 1921.

No Drawing.  Application filed November 9, 1916. Serial No. 130,416.

*To all whom it may concern:*

Be it known that I, PEDER FARUP, a subject of the King of Norway, residing at Trondhjem, in the Kingdom of Norway, have invented certain new and useful Improvements in the Manufacture of White Titanium-Oxid Products; and I do hereby declare the following to be a full, clear, and exact description of the invention, such as will enable others skilled in the art to which it appertains to make and use the same.

This invention relates to a process of rendering titanium oxygen compounds suitable for use as pigments in white or light colored paints and to the product obtained thereby, the purpose of the invention being particularly to render the said compounds stable against chemical and physical action, and especially to prevent discoloration of the paint in which the pigment is used when exposed to the action of heat and light.

The process comprises broadly a treatment of titanium oxygen compounds whereby the compounds are covered with a substance which serves to protect the particles thereof against destructive external influences and which at the same time does not materially impair the value of the titanium compounds as pigments. Such substances as the relatively insoluble compounds of aluminum, calcium, lead, zinc and similar metals, as for example, the oxids, hydroxids, carbonates, sulfates, sulfids, etc., possess the desirable characteristics above set forth.

The process is preferably carried into effect by treating particles of the titanium compounds suspended in water with a solution of a salt or salts of the metal or metals chosen, thoroughly stirring the mixture and subsequently introducing a suitable precipitant whereby the metal or metals chosen are deposited upon the particles of the titanium compound in a relatively insoluble form. Suitable precipitants for this purpose comprise for example, sodium carbonate, sodium hydroxid, ammonium hyroxid, a sulfate or sulfid, etc., of a metal or mixtures of such precipitants. The amount of protecting material employed depends to a certain extent on the character of the product sought, *i. e.*, whether it is desired that the special properties of the protecting material be prominent or negligible. It has been found that only a comparatively low percentage of the protecting material is necessary to stabilize the pigment, and unless it is desired to modify the inherent characteristics of the pigment, I prefer that only this small quantity be employed.

In order that the invention may be thoroughly comprehended the following example of the process is given, it being understood that this is done for illustrative purposes and that the invention is not intended to be limited thereby or to the materials selected.

The titanium compounds selected, for example, either an oxid or a hydroxid, is if necessary reduced to a state of sufficient fineness for suspension in water. The powder is placed into a vat of water and kept in suspension. A solution of aluminum sulfate in the desired quantity is added to the contents of the vat. I have found that good results are obtained by using the aluminum sulfate in quantities sufficient to cause the final product to contain aluminum oxid corresponding to about two and one-half per cent. by weight of the titanium compound present. After thorough mixing, a solution of sodium carbonate is added in quantity sufficient to precipitate the aluminum in the form of a hydroxid. Agitation is continued until the precipitation is complete. The solid particles are allowed to settle and the supernatant liquid is drawn off. The precipitate, which comprises the titanium compound now covered with aluminum hydroxid, is thoroughly washed and dried, and further treated to obtain the desired product. The product when reduced to powder is ready for use as a pigment, or for other uses to which it is adapted. It is white or light colored and is practically stable against the action of heat and light incident to the ordinary use of paint.

The foregoing detailed description has been given for clearness of understanding and no undue limitation should be deduced therefrom, but the appended claims should be construed as broadly as permissible in view of the prior art.

What I claim as new and desire to secure by Letters Patent is:

1. The process of stabilizing a titanium oxygen compound for use as a pigment, which comprises precipitating upon particles thereof a white and relatively insoluble compound of a metal.

2. The process of stabilizing a titanium oxygen compound for use as a pigment, which comprises precipitating upon particles thereof a relatively insoluble compound of aluminum, substantially as described.

3. The process of stabilizing a titanium oxygen compound for use as a pigment, which comprises precipitating aluminum hydroxid upon particles thereof, substantially as described.

4. The process of stabilizing a titanium oxygen compound for use as a pigment, which comprises precipitating aluminum hydroxid upon particles thereof, the quantity of resultant aluminum oxid being two and one-half per cent. by weight of the quantity of titanium oxygen compound in the resultant product, substantially as described.

5. The process of stabilizing a titanium oxygen compound for use as a pigment, which comprises precipitating upon particles thereof a white and relatively insoluble compound of a metal by means of a precipitant, one of the resultant compounds of the reaction being soluble.

6. The process of stabilizing a titanium oxygen compound for use as a pigment, which comprises precipitating upon suspended particles thereof a white and relatively insoluble compound of a metal by means of a precipitant, one of the resultant compounds of the reaction being soluble.

7. The process of stabilizing a titanium oxygen compound for use as a pigment, which consists in precipitating upon suspended particles thereof a relatively insoluble compound of aluminum by means of a soluble carbonate, substantially as described.

8. The process of stabilizing a titanium oxygen compound for use as a pigment, which consists in precipitating aluminum hydroxid upon suspended particles thereof by means of a soluble carbonate, substantially as described.

9. The process of stabilizing a titanium oxygen compound for use as a white or light colored pigment, which consists in precipitating aluminum hydroxid upon suspended particles thereof by means of sodium carbonate, substantially as described.

10. As a new and useful article of manufacture, a pigment comprising a titanium oxygen compound and a stabilizing agent for the said compound, the stabilizing agent comprising a relatively insoluble precipitated compound of aluminum, substantially as described.

11. As a new and useful article of manufacture, a pigment comprising a titanium oxygen compound and a stabilizing agent for the said compound, the stabilizing agent comprising aluminum oxid, substantially as described.

12. As a new and useful article of manufacture, a pigment comprising a titanium oxygen compound and aluminum oxid, the quantity of aluminum oxid being two and one-half per cent. by weight of the quantity of titanium oxygen compound, substantially as described.

In testimony that I claim the foregoing as my invention, I have signed my name in presence of two subscribing witnesses.

PEDER FARUP.

Witnesses:
FERNANDA OLSEN,
NANNA ELLISEN.